US007884762B2

(12) United States Patent
Abraham (10) Patent No.: US 7,884,762 B2
(45) Date of Patent: Feb. 8, 2011

(54) METHOD AND APPARATUS FOR RECEIVING A GLOBAL POSITIONING SYSTEM SIGNAL USING A CELLULAR ACQUISITION SIGNAL

(75) Inventor: Charles Abraham, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 11/322,839

(22) Filed: Dec. 30, 2005

(65) Prior Publication Data

US 2006/0244658 A1    Nov. 2, 2006

Related U.S. Application Data

(60) Division of application No. 09/993,335, filed on Nov. 6, 2001, now Pat. No. 7,053,824, which is a continuation-in-part of application No. 09/884,874, filed on Jun. 19, 2001, now Pat. No. 6,560,534, which is a continuation-in-part of application No. 09/875,809, filed on Jun. 6, 2001, now Pat. No. 6,542,820.

(51) Int. Cl.
 *G01S 19/25* (2010.01)
(52) U.S. Cl. .................................. 342/357.64
(58) Field of Classification Search ............ 342/357.15, 342/357.09, 357.1, 357.14; 455/434
 See application file for complete search history.

(56) References Cited

U.S. PATENT DOCUMENTS

| 4,445,118 | A |  | 4/1984 | Taylor et al. |
|---|---|---|---|---|
| 4,894,662 | A |  | 1/1990 | Counselman |
| 5,043,736 | A |  | 8/1991 | Darnell et al. |
| 5,119,504 | A |  | 6/1992 | Durboraw, III |
| 5,223,844 | A |  | 6/1993 | Mansell et al. |
| 5,225,842 | A |  | 7/1993 | Brown et al. |
| 5,365,450 | A |  | 11/1994 | Schuchman et al. |
| 5,408,237 | A |  | 4/1995 | Patterson et al. |
| 5,417,217 | A |  | 5/1995 | Morita et al. |
| 5,418,537 | A |  | 5/1995 | Bird |
| 5,430,657 | A |  | 7/1995 | Kyrtsos |
| 5,506,781 | A |  | 4/1996 | Cummiskey et al. |
| 5,589,833 | A |  | 12/1996 | Randall et al. |
| 5,663,735 | A | * | 9/1997 | Eshenbach ............. 342/357.15 |

(Continued)

FOREIGN PATENT DOCUMENTS

CA    2177310    12/1996

(Continued)

OTHER PUBLICATIONS

*International Search Report*, PCT/US02/35311.

(Continued)

*Primary Examiner*—Gregory C Issing
(74) *Attorney, Agent, or Firm*—McAndrews, Held & Malloy, Ltd.

(57) ABSTRACT

Method and apparatus for a GPS device that uses at least one cellular acquisition signal is described. More particularly, a GPS device is configured to receive at least one cellular acquisition signal for obtaining benefits associated with AGPS with only a small subset of AGPS circuitry to interact with a cell phone network. This facilitates use of GPS devices without subscription to a cell phone service provider, thus avoiding cellular subscription fees.

14 Claims, 5 Drawing Sheets

U.S. PATENT DOCUMENTS

| | | | |
|---|---|---|---|
| 5,673,256 A | 9/1997 | Maine | |
| 5,726,893 A | 3/1998 | Schuchman et al. | |
| 5,786,789 A | 7/1998 | Janky | |
| 5,828,336 A | 10/1998 | Yunck et al. | |
| 5,841,396 A | 11/1998 | Krasner | |
| 5,845,227 A | 12/1998 | Peterson | |
| 5,877,724 A | 3/1999 | Davis | |
| 5,889,492 A | 3/1999 | Kurby et al. | |
| 5,913,170 A | 6/1999 | Wortham | |
| 5,917,444 A | 6/1999 | Loomis et al. | |
| 5,938,721 A | 8/1999 | Dussell et al. | |
| 5,943,014 A | 8/1999 | Gilhousen | |
| 5,963,167 A | 10/1999 | Lichten et al. | |
| 5,983,109 A | 11/1999 | Montoya | |
| 5,999,124 A | 12/1999 | Sheynblat | |
| 6,064,336 A | 5/2000 | Krasner | |
| 6,067,045 A | 5/2000 | Castelloe et al. | |
| 6,081,229 A | 6/2000 | Soliman et al. | |
| 6,084,544 A | 7/2000 | Camp, Jr. | |
| 6,097,974 A | 8/2000 | Camp, Jr. et al. | |
| 6,107,960 A | 8/2000 | Krasner | |
| 6,121,923 A | 9/2000 | King | |
| 6,121,928 A * | 9/2000 | Sheynblat et al. | 342/463 |
| 6,122,506 A | 9/2000 | Lau et al. | |
| 6,131,067 A | 10/2000 | Girerd et al. | |
| 6,133,874 A | 10/2000 | Krasner | |
| 6,134,483 A | 10/2000 | Vayanos et al. | |
| 6,150,980 A | 11/2000 | Krasner | |
| 6,178,195 B1 * | 1/2001 | Durboraw et al. | 375/136 |
| 6,188,351 B1 | 2/2001 | Bloebaum | |
| 6,204,808 B1 | 3/2001 | Bloebaum et al. | |
| 6,211,819 B1 | 4/2001 | King | |
| 6,215,441 B1 | 4/2001 | Moeglein et al. | |
| 6,215,442 B1 | 4/2001 | Sheynblat et al. | |
| 6,222,483 B1 | 4/2001 | Twitchell et al. | |
| 6,239,742 B1 | 5/2001 | Krasner | |
| 6,256,475 B1 | 7/2001 | Vannucci | |
| 6,272,316 B1 | 8/2001 | Wiedeman et al. | |
| 6,285,315 B1 | 9/2001 | Pratt | |
| 6,289,279 B1 * | 9/2001 | Ito et al. | 701/213 |
| RE37,408 E | 10/2001 | Loomis et al. | |
| 6,313,787 B1 | 11/2001 | King et al. | |
| 6,323,804 B1 | 11/2001 | Kurby et al. | |
| 6,369,751 B1 | 4/2002 | Naruse | |
| 6,377,585 B1 | 4/2002 | Funderburk et al. | |
| 6,411,892 B1 | 6/2002 | van Diggelen | |
| 6,411,899 B2 | 6/2002 | Dussell et al. | |
| 6,433,735 B1 * | 8/2002 | Bloebaum et al. | 342/357.1 |
| 6,453,237 B1 | 9/2002 | Fuchs et al. | |
| 6,492,945 B2 * | 12/2002 | Counselman et al. | 342/464 |
| 6,542,820 B2 | 4/2003 | LaMance et al. | |
| 6,560,534 B2 | 5/2003 | Abraham et al. | |
| 6,636,740 B1 | 10/2003 | Ramesh | |
| 6,642,884 B2 | 11/2003 | Bryant et al. | |
| 6,693,882 B1 | 2/2004 | Gu et al. | |
| 6,725,159 B2 | 4/2004 | Krasner | |
| 6,799,116 B2 | 9/2004 | Robbins | |
| 6,813,560 B2 | 11/2004 | van Diggelen et al. | |
| 6,829,535 B2 | 12/2004 | van Diggelen et al. | |
| 6,856,282 B2 | 2/2005 | Mauro et al. | |
| 2002/0024461 A1 | 2/2002 | Moeglein et al. | |
| 2002/0032526 A1 | 3/2002 | van Diggelen | |
| 2002/0049536 A1 | 4/2002 | Gaal | |
| 2002/0172313 A1 | 11/2002 | Smith et al. | |
| 2002/0188403 A1 | 12/2002 | LaMance et al. | |
| 2002/0198657 A1 | 12/2002 | Robbins | |
| 2003/0023379 A1 | 1/2003 | Diggelen et al. | |
| 2003/0098810 A1 | 5/2003 | Lee et al. | |
| 2003/0212821 A1 | 11/2003 | Gillies et al. | |
| 2003/0223422 A1 | 12/2003 | Igarashi et al. | |
| 2004/0203853 A1 | 10/2004 | Sheynblat | |
| 2004/0203915 A1 * | 10/2004 | van Diggelen et al. | 455/456.1 |
| 2005/0003833 A1 | 1/2005 | Younis | |

FOREIGN PATENT DOCUMENTS

| | | |
|---|---|---|
| EP | 1 197761 | 4/2002 |
| EP | 1197761 A | 4/2002 |
| GB | 2307812 A | 6/1997 |
| WO | WO-8912835 A1 | 12/1989 |
| WO | WO-9809181 A1 | 3/1998 |
| WO | WO 99/19743 | 4/1999 |
| WO | WO-9919743 A1 | 4/1999 |
| WO | WO-0175473 A2 | 10/2001 |
| WO | WO 02/103383 | 12/2002 |
| WO | WO-02/103383 | 12/2002 |
| WO | WO 03/010912 | 2/2003 |

OTHER PUBLICATIONS

Cameron, M., et al., "Intelligent Transportation System Mayday Becomes a Reality", *Navsys Corporation*, IEEE 1995, pp. 340-347.

Dietrich, F. J., et al., "The Globalstar Cellular Satellite System", *IEEE Transaction on Amtennas and Propagation*, 46 (6), Publisher item Identifier S 0018-926X(98),(Jun. 1998), pp. 935-942.

Johnson LT., G.W., "Communications Technologies for Automated Dependent Surveillance", *USCG Research & Development Center* (1995), pp. 40-44.

Makino, H., et al., "Development of Navigation System for the Blind Using GPS and Mobile Phone Combination", *18th Annual International Conference of the IEEE Engineering in Medicine and Biology Society*, (1996), pp. 506-507.

Sennott, DR., J. W., et al., "A High Performance Position Tracker for Embedded Paging, Cellular Telephone, and Law Enforcement Applications", *Department of Electrical and Computer Engineering and Technology, IEEE 1992*, pp. 96-103.

Stewart, J. M., "Vehicle Location and Position Monitoring System Using Satellite Navigation and Cellular Telephone", *LITEF GmbH*, pp. 7 and 1-15.

Sturza, M. A., "Architecture of the Teledesic Satellite System", *Teledesic Corporation*, pp. 1-7.

Wheatley, C., "CDMA's Dependence on Good Timing and Related Issues", *IEEE International Frequency Control Symposium*, Qualcomm Incorporated,(1996), pp. 1211-1218.

Zhao, Y., "Efficient and Reliable Data Transmission for Cellular-and-GPS-Based Mayday Systems", *Motorola, Inc., Chicago Corporate Reserach Laboratories*, IEEE 1998, pp. 555-559.

Djuknic, Goran M., et al., "Geolocation and Assisted GPS", *Computer* vol. 34, Issue 2 (Feb. 2001), 123-125.

Van Diggelen, Frank, "Global Locate Indoor GPS Chipset & Services", *JON GPS 2001*,Sep. 11-14, 2001, Salt Lake City, UT, USA, (Online) Sep. 11, 2001, pp. 1515-1521, XP002358532 Retrieved from the Internet: URL:http://ww.ion.org/: (retrieved on Dec. 9, 2005).

International Search Report mailed Jul. 10, 2007 for PCT Application No. PCT/US2007/001187.

Written Opinion mailed Jul. 10, 2007 for PCT Application No. PCT/US2007/001187.

Diesposti, Raymond, et al., "Of Mutual Benefit: Merging GPS and Wireless Communications," GPS World, vol. 9, No. 4, pp. 44-48, Apr. 1998.

Dieposti, Raymond, et al., "The Benefits of Integrating GPS, INS and PCS, " The Aerospace Corp., ION-GPS-98, Session D1, Receiver Systems and Technology I: New Receiver Architectures & Signal Processing Strategies, Nashville Convention Center, Nashville, Tennessee,, pp. 327-331, Sep. 15-18, 1998.

Francisco, Sherman G., "GPS Operational Control Segment," Global Positioning System: Theory and Applications, Ch. 10, pp. 435-466, 1994.

International GPS Service for Geodynamics, 1996 Annual Report, IGS Central Bureau, Nov. 1997.

International GPS Service for Geodynamics, 1997 Technical Reports, IGS Central Bureau, Oct. 1998.

International GPS Service for Geodynamics, 1999 Technical Reports, IGS Central Bureau, pp. 13-164, Nov. 2000.

International GPS Service for Geodynamics, 2000 Technical Reports, IGS Central Bureau, pp. 71-148, Nov. 2001.
NAVSTAR GPS Space Segment / Navigation User Interfaces, ICD-GPS-200, Jul. 3, 1991.
Neilan, Ruth E., et al., "The International GPS Service: A Global Resource for GPS Applications and Research," Institute of Navigation, ION GPS-97, 10th International Technical Meeting, Kansas City, Missouri, Sep. 16-19, 1997.
Schenewerk, Dr. Mark S., et al., "Rapid Turnaround GPS Ephemerides from the National Geodetic Survey," Proceedings of the ION GPS-93, Institute of Navigation, pp. 247-255, 1993.
Zumberge, J.F., et al., "Ephemeris and Clock Navigation Message Accuracy," Global Positioning System: Theory and Applications, Ch. 16, pp. 585-599, 1994.
NAVSTAR GPS, Interface Control Document GPS (200), Jul. 1, 1992.
NAVSTAR GPS, ICD-GPS-200, Revision C, Oct. 10, 1993, Oct. 13, 1995, Sep. 25, 1997, Oct. 1, 1999, Apr. 12, 2000, Jan. 14, 2003.
Russell, S.S., et al. "Control Segment and User Performance," Navigation: Journal of the Institute of Navigation, vol. 25, No. 2, pp. 166-172, Summer 1978.
RTCM Recommended Standards for Differential NAVSTAR GPS Service, Version 2.0, RTCM Special Committee No. 104, RTCM Paper 134-89/SC 104-68, Jan. 1, 1990.
Garin, T.J., et al. "Wireless Assisted GPS-SiRF Architecture and Field Test Results," ION GPS '99, Nashville, TN, pp. 489-497, Sep. 14-17, 1999.
Expert Report of Stephen Heppe Regarding Invalidity of U.S. patent Nos. 6,417,801, 6,606,346, 6,651,000, 6,704,651, 6,937,187, and 7,158,080, Feb. 25, 2008.
First Supplemental Report of Dr. Stephen Heppe Regarding Invalidity of U.S. Patent Nos. 6,417,801, 6,606,346, 6,937,187 and 7,158,080, Apr. 4, 2008.
Second Supplemental Report of Dr. Stephen Heppe Regarding Invaldiity of U.S. Patent Nos. 7,158,080, 6,651,000 and 6,704,651, Apr. 8, 2008.
Respondent SiRF Technology, Inc.'s First Supplemental Objections and Responses to Global Locate, Inc.'s First Set of Interrogatories (Nos. 22, 23 and 49) and Exhibits 23-27, Aug. 24, 2007.
Respondent SiRF Technology, Inc.'s Sixth Supplemental Objections and Responses to Global Locate, Inc.'s First Set of Interrogatories (Nos. 19, 21-23, and 27-28), Apr. 3, 2008.
Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 23-27, Aug. 31, 2007.
Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.
Melbourne, W.G., et al. "Scientific Applications of GPS on Low Earth Orbiters," Jet Propulsion Laboratory, California Institute of Technology, http://hdl.handle.net/2014/32419, 1994.
Young, L., et al. "GPS Precision Orbit Determination: Measured Receiver Performance," Jet Propulsion Laboratory, California Institute of Technology, http://hdl.handle.net/2014/35887, 1993.
Chansarkar, M., et al. "Acquisition of GPS Signals at Very Low Signal to Noise Ratio," ION NTM 2000, Anaheim, CA, pp. 731-737, Jan. 26-28, 2000.

Lamance, J., et al. "Assisted GPS - Low Infrastructure Approach," GPS World, vol. 13, No. 3, pp. 46-51, Mar. 2002.
Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.
Aparicio., M., et al. "GPS Satellite and Payload," Global Positioning System: Theory and Applications vol. I, Progress in Astronautics and Aeronautics, vol. 163, Ch. 6, pp. 209-244, 1996.
File History—U.S. Appl. No. 10/081,164, Feb. 22, 2002.
Van Diggelen, F., "Global Locate Indoor GPS Chipset and Services," ION-GPS-2001, Salt Lake City, Utah, pp. 1-7, Sep. 11-14, 2001.
Yiu, K., et al. "A Low-Cost GPS Receiver for Land Navigation," Global Positioning System, Hewlett-Packard Laboratories, Palo Alto, CA, pp. 44-60, May 1982.
Bertiger, W.I., et al. "GPS Precise Tracking of Topex/Poseidon: Results & Implications," Submitted for Publication to JGR TOPEX/Poseidon Special Issue, http://hdl.handle.net/2014/33763, Nov. 1993.
Enge, P.K., et al. "Wide Area Augmentation System," Global Positioning System: Theory and Applications vol. II, Progress in Astronautics and Aeronautics, vol. 164, Ch. 4, pp. 117-142, 1996.
Initial Determination, Certain GPS Devices and Products Containing Same, United States International Trade Commission Investigation No. 337-TA-602, Public Version, Nov. 25, 2008.
Rebuttal Expert Report of Phil Dafesh Regarding U.S. Patent Nos. 6,651,000 and 7,158,080 in Response to Expert Report of Stephen Heppe, Redacted—Non-Confidential Version, Mar. 10, 2008.
Respondents'Notice of Prior Art, Certain GPS Devices and Products Containing Same, United States International Trade Commission Investigation No. 337-TA-602, Feb. 15, 2008.
Respondents' First Supplemental Corrected Notice of Prior Art, Certain GPS Devices and Products Containing Same, United States International Trade Commission Investigation No. 337-TA-602, Mar. 4, 2008.
Complainants' Notice of Prior Art Pursuant to Ground Rule 5, Certain GPS Devices and Products Containing Same, United States International Trade Commission Investigation No. 337-TA-602, Feb. 15, 2008.
Commission Investigative Staff's Notice of Prior Art, Certain GPS Devices and Products Containing Same, United States International Trade Commission Investigation No. 337-TA-602, Feb. 15, 2008.
Bertiger, W.I., et al., "GPS precise tracking of TOPEX/POSEIDON: Results and Implications," Journal of Geophysical Research, vol. 99, No. C12, pp. 24, 449-24, 464, Dec. 15, 1994.
International Search Report, dated Mar. 17, 2004 for corresponding PCT application, PCT/US03/30872.
Zhao, Y, "Mobile Phone Location Determination and Its Impact on Intelligent Transportation Systems," IEEE Transactions on Intelligent Transportation Systems, vol. 1, No. 1, Mar. 2000.
Zhao, Y, "Standardization of Mobile Phone Positioning for 3G Systems," IEEE Communications Magazine, Jul. 2002.
Complaints' First Amended Complaint under Section 337 of the Tariff Act of 1930, as Amended, Certain GPS Devices and Products Containing Same, United States International Trade Commission Investigation No. 337-TA-302, Feb. 8, 2008.
Commission Opinion, Certain GPS Devices and Products Containing Same, United States International Trade Commission Investigation No. 337-TA-602, Jan. 27, 2009.
*SiRF v. Broadcom*, U.S. Court Appeals for the Federal Circuit, 2009-1262, decided Apr. 12, 2010.

* cited by examiner

METHOD AND APPARATUS FOR RECEIVING A GLOBAL POSITIONING SYSTEM SIGNAL USING A CELLULAR ACQUISITION SIGNAL

CROSS-REFERENCE TO RELATED APPLICATIONS

This application is a divisional of U.S. patent application Ser. No. 09/993,335, filed Nov. 6, 2001 now U.S. Pat. No. 7,053,824, which is a continuation-in-part of U.S. patent application Ser. No. 09/884,874, filed Jun. 19, 2001, now U.S. Pat. No. 6,560,534, which is a continuation-in-part of U.S. patent application Ser. No. 09/875,809, filed Jun. 6, 2001, now U.S. Pat. No. 6,542,820. Each of the aforementioned related patent applications is herein incorporated by reference. This application contains subject matter that is related to co-pending U.S. patent application Ser. No. 09/715,860, filed Nov. 17, 2000, now U.S. Pat. No. 6,417,801, which is herein incorporated by reference in its entirety.

BACKGROUND OF THE INVENTION

1. Field of the Invention

The present invention relates to mobile wireless devices for mobile location systems, and more particularly to Global Positioning Satellite (GPS) receivers with improved indoor penetration for personal location systems.

2. Description of the Related Art

With the advent of GPS, there has been a growing demand for mobile devices that may be used to provide a person's or an object's location. Devices built using conventional GPS receivers have been developed by a number of companies. However, these devices have significant limitations, one of which is indoor penetration.

To address the above limitation of conventional GPS receivers, a combination of mobile GPS receivers and cellular infrastructure communicating via wireless links has evolved. This combination of technologies, known as Assisted GPS (AGPS), combines a GPS receiver with a cellular handset. The cellular handset provides a two-way link for communicating positioning data ("aiding data").

In particular, performance of a conventional GPS mobile device in indoor environments may be limited by ability of the GPS mobile device to decode a navigation data stream broadcast by each of a plurality of satellites. Among other components, each navigation data stream contains a satellite trajectory model having parameters describing a respective satellite's orbit and dock variation as a function of time. The satellite trajectory model in the navigation data stream is sometimes referred to as "broadcast ephemeris." GPS mobile devices traditionally receive and decode the navigation data stream to extract the broadcast ephemeris, which is needed to compute position. However, a signal-to-noise ratio in indoor environments is often insufficient for navigation data bit decoding of the broadcast ephemeris. Thus, another means of ascertaining satellite orbit and docks variations was needed.

In AGPS systems, the satellite orbit and dock variation, or information derived from these components, is provided to the GPS mobile device via a two-way cellular link. A two-way cellular link is used to request and receive information on such satellites, and the AGPS service is conventionally available only to authorized subscribers to a cellular network.

While AGPS offers improvements in indoor penetration, addition of a cellular handset and a subscription to a wireless provider adds to the cost and power consumption of a GPS receiver. Cellular handsets contain complex and costly components. For example, the cost of adding a cell phone alone to a GPS receiver may be prohibitive for GPS applications where a phone would otherwise be an unnecessary addition, let alone the addition of a subscription fee of a cellular provider. Moreover, cellular transmission consumes power.

Therefore, it would be desirable to provide a GPS mobile device that is comparable in cost to conventional GPS handheld devices but with the indoor penetration benefits associated with AGPS handsets.

SUMMARY OF THE INVENTION

The present invention provides apparatus and method for obtaining benefits associated with AGPS without requiring complete integration of a GPS device with a cellular handset. Furthermore, the present invention facilitates a GPS handheld or mobile device configured to operate without subscription to a cell phone service provider, and thus eliminates fees for such subscription. An aspect of the present invention is a GPS handheld device that comprises a cellular acquisition signal receiver or front end. It will be appreciated that circuitry required to receive an acquisition signal comprises only a portion of a complete cellular handset. Particularly, a transmitter portion for communicating with a base station of a cellular network is not included in the GPS handheld device. Furthermore, digital signal processor and application processor(s) configured for modulating, demodulating, voice processing, call protocols, subscriber identification and the like are absent in the GPS handheld device. The cellular acquisition signal receiver allows the GPS handheld device to have an accurate time of day and/or frequency reference, thus assisting in GPS signal acquisition and GPS position computation.

An aspect of the present invention is a method for receiving a GPS signal. More particularly, a frequency correction burst is obtained from a cellular network. A frequency offset responsive to the frequency correction burst is determined, and a window of frequency search responsive to the frequency offset is determined for receiving the GPS signal. This may be done without having to transmit a cellular signal to the cellular network, and this may be done without having to have a subscription to the cellular network.

Another aspect of the present invention is a method for receiving a GPS signal to a GPS handheld device. More particularly, a time synchronization burst is obtained from a cellular network. A timing offset responsive to the time synchronization burst is determined, and a time of day responsive to the timing offset is determined for receiving the GPS signal. This may be done without having to transmit a cellular signal to the cellular network, and this may be done without having to have a subscription to the cellular network.

Another aspect of the present invention is a method for determining position of a GPS handheld device in proximity to a cellular base station of a cellular network. More particularly, at least one of location information and identification information is obtained from the cellular base station, and a position estimate of the GPS handheld device responsive to the at least one of location information and identification information is determined. This may be done without having to transmit a cellular signal to the cellular network, and this may be done without having to have fee-based access to the cellular network.

Another aspect of the present invention is GPS mobile device. More particularly, the GPS mobile device comprises at least one antenna. The at least one antenna is coupled to a cellular acquisition signal front end couple to receive a cellular acquisition signal. A GPS signal front end is coupled to the at least one antenna to receive a GPS signal. A GPS/cellular processor is coupled to the GPS front end and to the cellular acquisition front end. The GPS/cellular processor is configured with a GPS baseband processor in communication with the GPS front end and a cellular acquisition signal baseband processor in communication with the cellular acquisition signal front end. A reference oscillator is coupled to the GPS/cellular processor. A general purpose processor is coupled to the cellular acquisition signal baseband processor and to the GPS baseband processor, and memory is coupled to the general purpose processor.

BRIEF DESCRIPTION OF THE DRAWINGS

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention relates to implementing a GPS system using a GPS handheld configured for receiving acquisition signals from a cellular provider without requiring integration of the GPS receiver with a two-way capable cellular handset. The present invention provides one or more benefits conventionally associated AGPS while eliminating the requirement for obtaining aiding data from a cellular network.

An aspect of the present invention is a method for configuring the GPS device to store satellite trajectory data that replaces assistance data provided in AGPS systems. In AGPS systems, receiving assistance data from a cellular network requires a two-way capable cellular handset to request and receive such assistance data. Moreover, such services are commonly available only to paying subscribers to the cellular network. In particular, in one aspect of the present invention, satellite trajectory models are stored in memory in a GPS mobile device. The source of the satellite trajectory models stored in memory may be broadcast ephemeris, received and decoded when a GPS mobile device is outside in at least a medium signal strength signal environment in which navigation data decoding is feasible. Alternatively, satellite trajectory models may be supplied to the GPS mobile device through a computer network connection. If the satellite trajectory models comprise broadcast ephemeris, the satellite trajectory models may be valid for between approximately two and six hours. In another aspect of the invention, long-term satellite trajectory models are used, which may be valid for days. Once the satellite trajectory models are obtained and are in memory, the GPS mobile device may function indoors for the period of validity of the long-term satellite trajectory models. This eliminates the need to more frequently obtained assistance data as with conventional AGPS.

Another aspect of the present invention is a method for determining time offset of a GPS mobile device. More particularly, a cellular acquisition signal may comprise a time synchronization signal that is received by the GPS mobile device, enabling the GPS mobile device to establish a time of day for applying satellite trajectory data. In addition, the time synchronization signal, if sufficiently precise, may be used to establish a delay search window, decreasing the search time required for GPS signal acquisition. In addition, the time synchronization signal may be used to align coherent averaging intervals with GPS signal data bits to improve signal to noise ratio.

Another aspect of the present invention is a method for determining time offset of a GPS mobile device. More particularly, a cellular acquisition signal can comprise a time synchronization signal that is received at the GPS mobile device, enabling the GPS mobile device's receiver to establish a time of day for applying satellite trajectory data. In addition, the time synchronization signal, if sufficiently precise, may be used to establish a delay search window, decreasing search time required for GPS signal acquisition. In addition, the time synchronization signal may be used to align coherent averaging intervals with GPS signal data bits to improve signal-to-noise ratio.

Another aspect of the present invention is a GPS mobile device comprising: one or more antennas configured to receive cellular acquisition signals and GPS satellite signals; radio frequency (RF) front end circuitry for the GPS signals; RF front end circuitry for the cellular acquisition signals; a cellular acquisition signal baseband processor; a GPS signal baseband processor; a time keeping counter common to the baseband processors; a reference oscillator coupled to the time keeping counter, baseband processors and front end circuitry; a processor coupled to the baseband processors; and memory coupled to the processor. In some embodiments, the GPS mobile device may additionally comprise a computer network-docking interface or a data modem or both.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
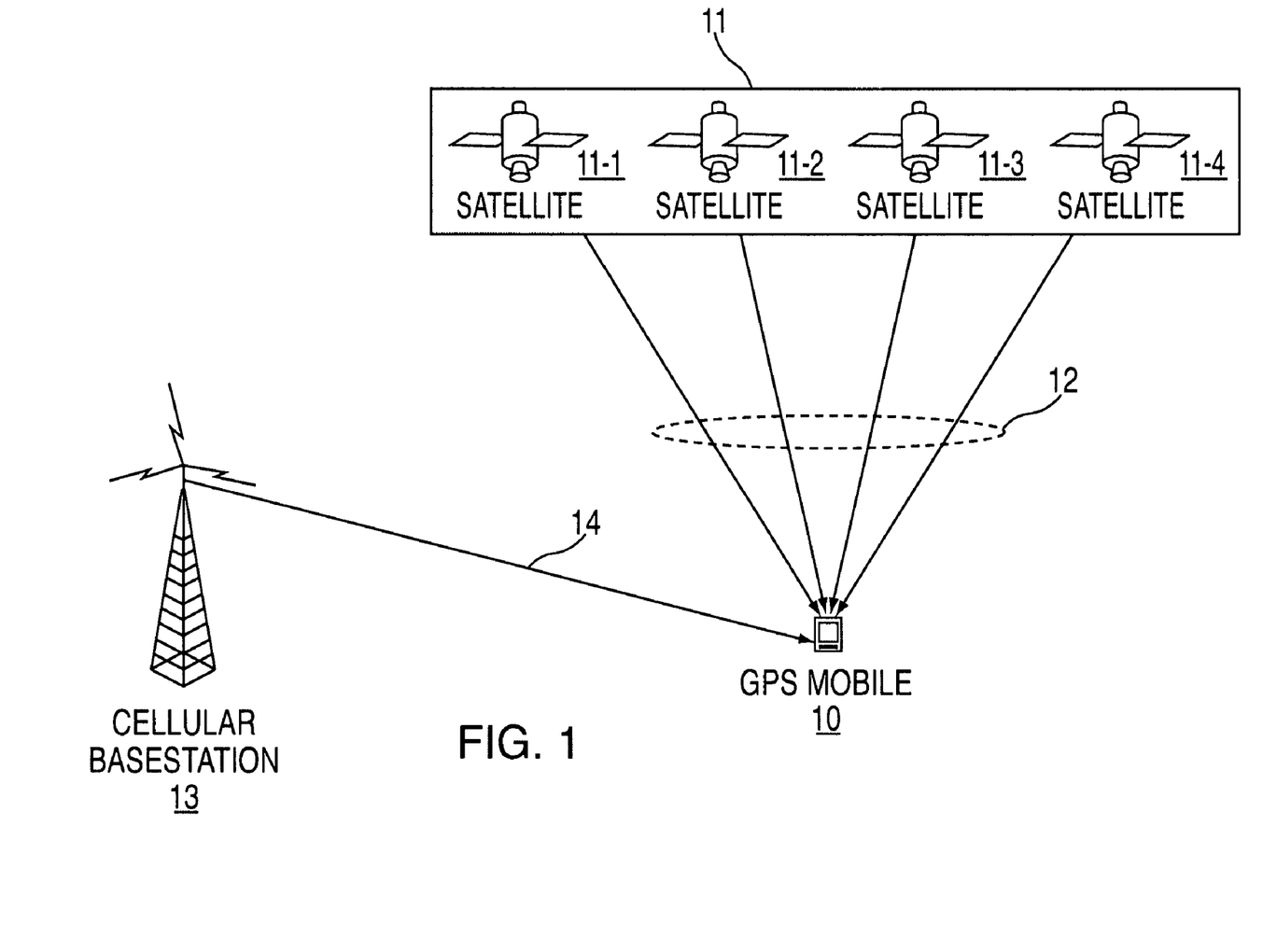
FIG. 1 is a network diagram of an exemplary portion of an embodiment of a GPS and cellular network in accordance with one or more aspects of the present invention.

Referring to FIG. 1, there is shown a network diagram of an exemplary portion of an embodiment of a GPS and cellular network in accordance with one or more aspects of the present invention. Satellite constellation 11 comprises a plurality of satellites. For purposes of illustration four satellites, namely, satellites 11-1, 11-2, 11-3 and 11-4, are shown, though fewer or more satellites may be used. GPS device 10 is configured to receive one or more satellite signals 12 from satellite broadcast. GPS device 10 is configured to receive satellite broadcast signals 12 as a form of one-way communication. GPS device 10 is configured to receive one or more cellular broadcast signals 14 from cellular base station 13. GPS device 10 is configured to receive cellular broadcast signals 14 as a form of one-way communication. GPS device 10 may be configured to operate to receive satellite information from satellite broadcast signals 12 or a computer network connection, as described below in more detail, or both. Furthermore, especially when operating in indoor or other satellite signal-harsh environments, one or more cellular acquisition signals 14 broadcast from communication tower 13 is utilized by GPS device 10.

Figure 2:
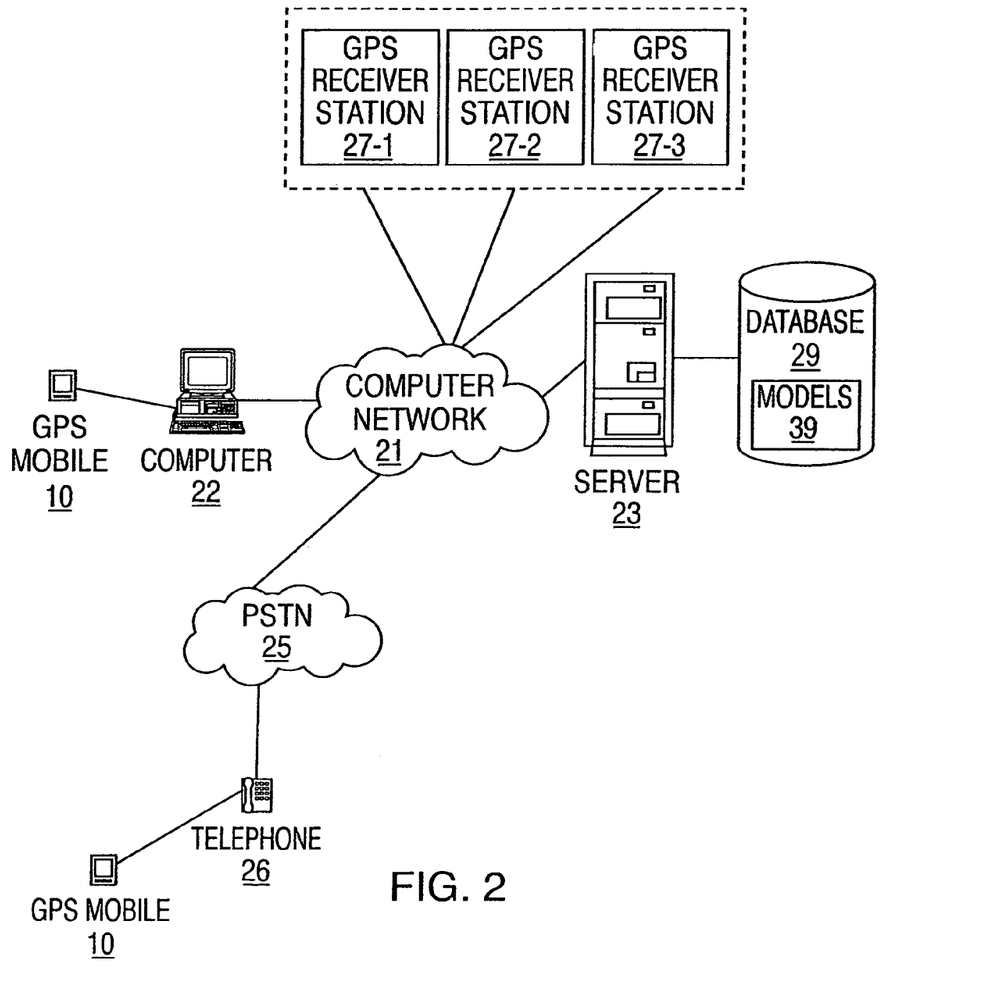
FIG. 2 is a network diagram of an exemplary portion of an embodiment of a GPS and computer network in accordance with one or more aspects of the present invention.

Referring to FIG. 2, there is shown a network diagram of exemplary portion of an embodiment of a GPS and a computer network for obtaining satellite information, such as one or more satellite trajectory models, in accordance with one or more aspects of the present invention. GPS mobile device 10 may be put in communication with computer 22. Computer 22 may be put in communication with computer network 21, which may form a portion of an intranet or the Internet. Network 21 may be put in communication with server 23. Server 23 comprises or has access to database 29. Database 29 comprises one or more satellite trajectory models 39, such as for respective satellites 11 of FIG. 1. Accordingly, server 23 may be in communication with one or more GPS receiver stations 27-1, 27-2, and 27-3 via network 21 for receiving broadcast ephemeris comprising satellite trajectory models 39. GPS mobile device 10 may have one or more satellite trajectory models 39 downloaded to it from server 23.

Alternatively, server 23 may be put in communication with publicly switched telephone network (PSTN) 25 via network 21. PSTN 25 may be put in communication with telephone 26, which may be put in communication with GPS mobile device 10. In this embodiment, a phone number, such as a toll free number, may be dialed in order to download one or more trajectory models to GPS mobile device 10.

Connection between mobile device 10 and server 23 may be established to refresh satellite trajectory models 39. At other times, this connection may be absent. For example, in field conditions lacking computer network 21 connectivity, GPS handheld 10 may obtain satellite information from one or more satellite signals 12 shown in FIG. 1. Such information is typically valid for approximately two to six hours from time of broadcast. Before the validity period ends, a GPS receiver should attain another valid broadcast of ephemeris information to continue to operate.

In another embodiment, satellite tracking data from GPS reference stations 27-1, 27-2, and 27-3 is used in server 23 to create long-term satellite trajectory models 39, which may be valid for periods of up to approximately one week. Orbit models and associated long-term orbit trajectory data are described in more detail in co-pending and related applications entitled "LONG TERM EPHEMERIS" to James W. LaMance, Charles Abraham and Frank van Diggelen, application Ser. No. 09/884,874, filed Jun. 19, 2001, and "METHOD AND APPARATUS FOR GENERATING AND DISTRIBUTING SATELLITE TRACKING" to James W. LaMance, Charles Abraham and Frank van Diggelen, application Ser. No. 09/875,809, filed Jun. 6, 2001. In one aspect of the present invention, long-term orbit trajectory models are used in GPS mobile device 10 to extend the period of validity of satellite trajectory models 39 provided by server 23. This increases the interval over which GPS mobile device 10 may be used in conditions wherein computer network 21 is not readily accessible.

Figure 3:
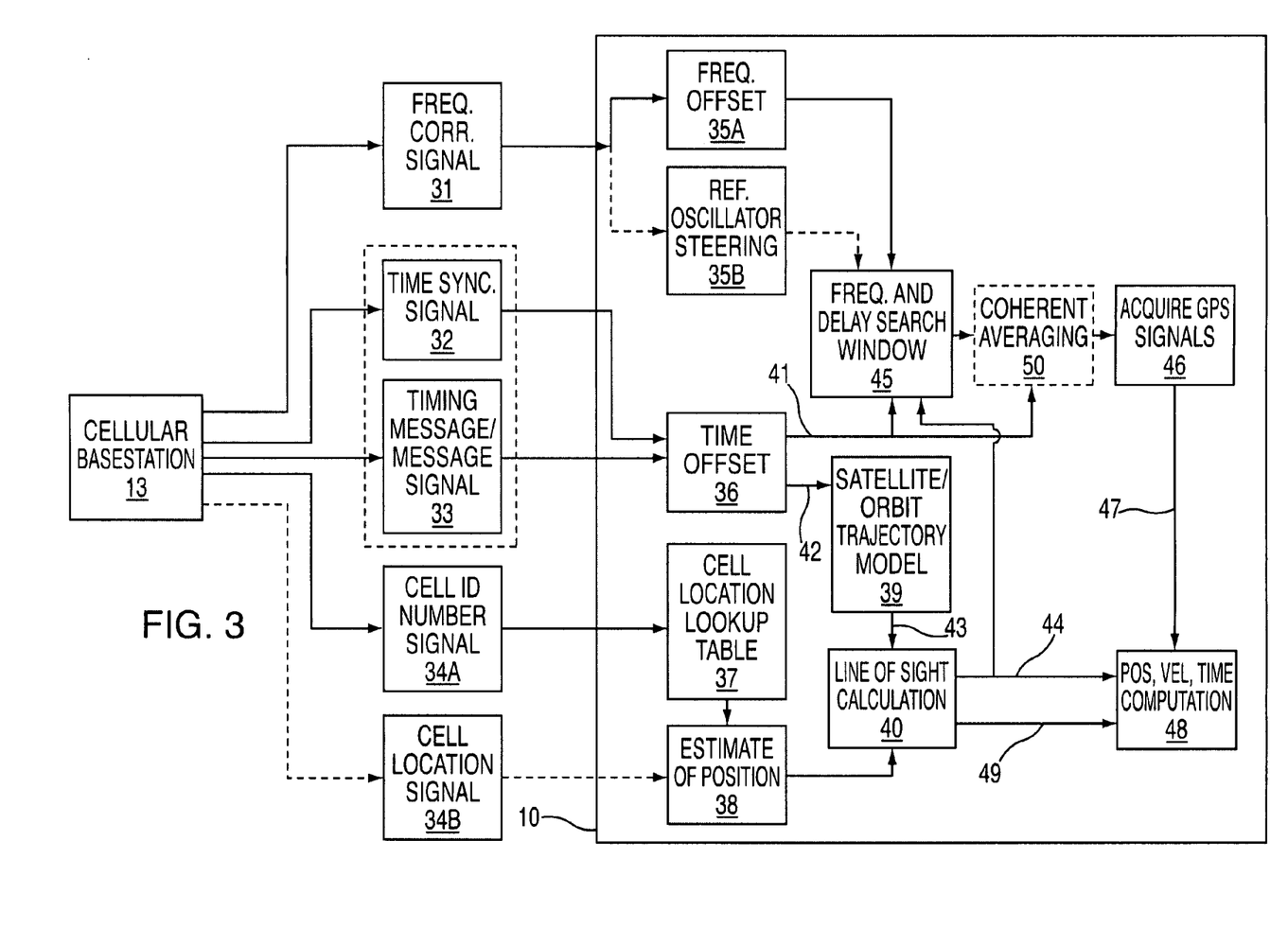
FIG. 3 is a flow diagram of an exemplary portion of an embodiment of a mobile or handset GPS unit receiving cellular acquisition signals in accordance with one or more aspects of the present invention.

Referring to FIG. 3, there is shown a flow diagram of an exemplary portion of an embodiment of a mobile or handset GPS unit receiving cellular acquisition signals in accordance with one or more aspects of the present invention. Cellular base station 13 broadcasts several cellular acquisition signals including frequency correction signal 31, time synchronization signal 32, timing message, such as a frame number, signal 33, and cell identification number signal 34A. Notably, time message signal 33 may be a separate signal or may be a time message 33 provided with time synchronization signal 32. In some embodiments of cellular base station 13, an additional signal, namely cell location signal 34B, is provided. It should be understood that one or more of these broadcast elements 31, 32, 33, 34A and 34B may be present or absent in particular cellular network implementations. Furthermore, in some cellular networks one or more of broadcast elements 31, 32, 33, 34A and 34B may be combined into various combinations of composite signals. In accordance with one or more aspects of the present invention, one or more of these signals 31, 32, 33, 34A and 34B may be utilized, whether individually, jointly, or in various combinations.

Conventionally, cellular acquisition signals are provided to enable, at least in part, a cellular handset to synchronize to a cellular base station, as a first step in establishing communication with a cellular network. In particular, in the first phase of establishing communication, the cellular handset monitors specific frequencies for the acquisition signals. In accordance with one or more aspects of the present invention one or more cellular acquisition signal is received, but a GPS mobile device does not continue with the subsequent steps needed to establish two-way communication with the cellular network. In particular, in accordance with one or more aspects of the present invention, a GPS mobile device does not transmit any data or message or both to the cellular network. Furthermore, a GPS mobile device may receive one or more acquisition signals without a cellular network subscription.

Figure 4:
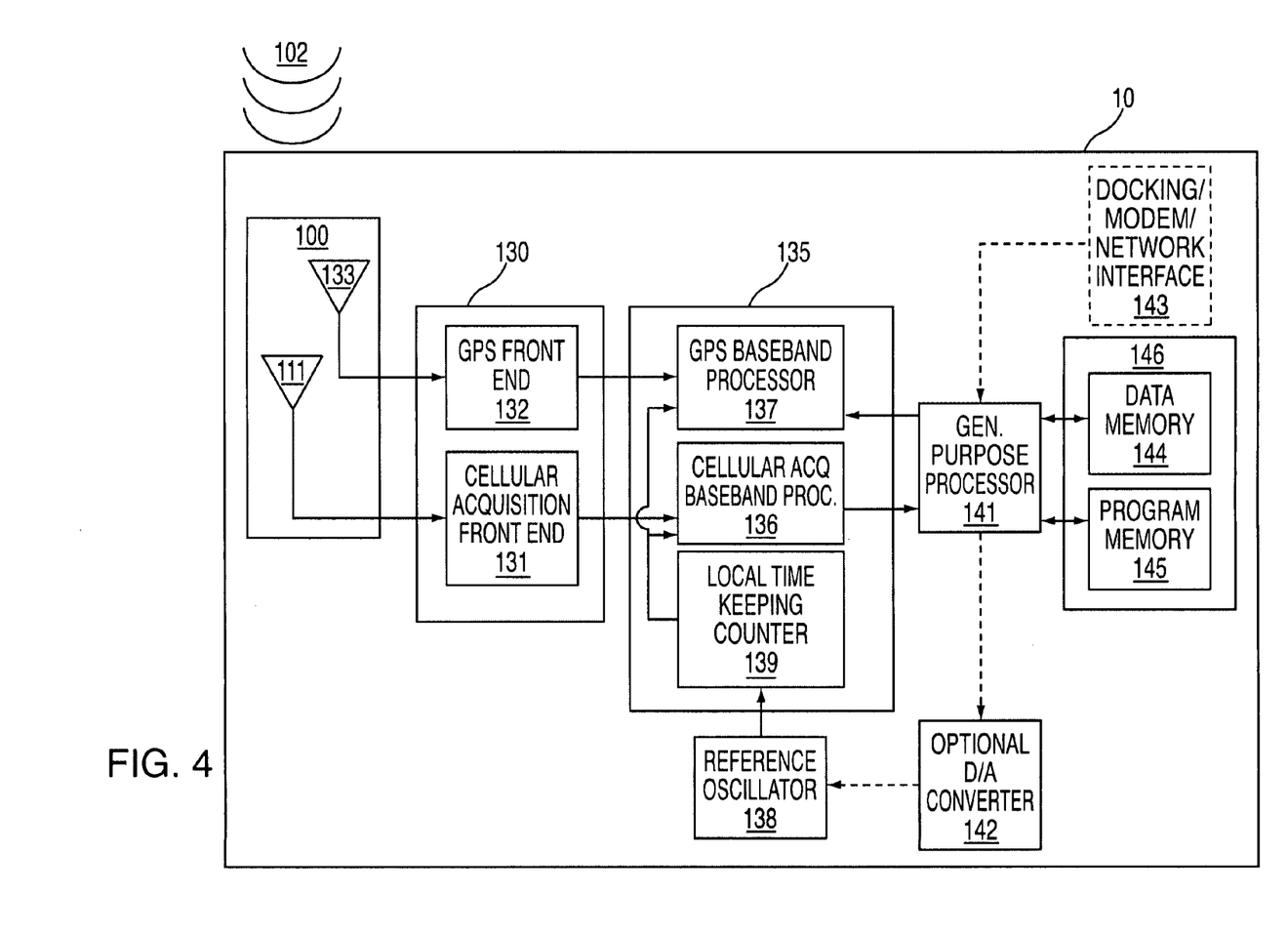
FIG. 4 is a chip-level block diagram of an exemplary portion of an embodiment of GPS unit in accordance with one or more aspects of the present invention.

Referring to FIG. 4, there is shown a block diagram of an exemplary portion of an embodiment of a mobile or handheld GPS 10 in accordance with one or more aspects of the present invention. With continuing reference to FIG. 4 and additional reference to FIG. 3, extra circuitry is added to a conventional GPS receiver to allow one or more cellular acquisition signals 31, 32, 33, 34A and 34B, collectively and singly cellular acquisition signals 102, to be received. This includes a second radio frequency (RF) tuner, namely cellular acquisition front end 131 coupled to an additional antenna, namely antenna 111. One or more cellular acquisition signals 102 are received by antenna 111 and provided from cellular acquisition front end 131 to cellular acquisition signal baseband 136. Cellular acquisition signal baseband 136 is used to lock and decode one or more cellular acquisition signals 102, for example, using conventional digital processing well known in the design of cell phones. For cost considerations, cellular acquisition front end 131 may be integrated into a conventional GPS front end 132, which is coupled to GPS antenna 133, on a single RF semiconductor integrated circuit 130. Moreover, to save cost, cellular acquisition signal baseband 136 may be integrated with a conventional GPS baseband 137 on a single digital signal processing semiconductor integrated circuit to provide a GPS/cellular processor 135. Examples of such integrated circuits include, but are not limited to, a digital signal processor (DSP). However, more than one integrated circuit may be used, for example, a DSP and an application specific integrated circuit (ASIC), and a DSP and an FPGA. Accordingly, by providing integrated circuits 130 and 135, only a marginal increment in cost is added to a conventional GPS. Furthermore, other technologies such as radio frequency CMOS (complimentary-metal-oxide-semiconductor) allow integration of baseband processor functions and front end functions into a single ASIC. Included in this marginal incremental cost are additional filters and an extra antenna, described in more detail with respect to FIG. 4. Moreover, because cellular acquisition signals 102 are relatively high in power, a simple antenna may be used in order to control costs even further. Alternatively, a single antenna 100 capable of receiving both GPS and cellular signals may be employed.

The nature of a frequency correction signal 31 varies depending on the cellular network. In CDMA systems, frequency correction signal 31 may comprise a pilot channel. The pilot channel is a common channel that is broadcast over a cell coverage area. Conventionally, the pilot channel uses a repeating pseudonoise (PN) sequence of $2^{15}$ chips. Multiple base stations transmit the same PN code but at different timing offsets to avoid mutual interference. To detect the pilot channel, GPS mobile device 10 may scan a range of PN code offsets until energy is detected, indicating a cellular base station transmitter, using a cellular acquisition front end 131 of FIG. 4. By phase or frequency locking to a detected pilot signal, GPS mobile device 10 may measure a frequency offset 35A related to error in a reference oscillator of GPS mobile device 10, such as reference oscillator 138 of FIG. 4. Alternatively, GPS mobile device 10 may make an open loop measurement of frequency error of a pilot signal to determine frequency offset 35A.

In GSM systems, frequency correction signal 31 is a frequency correction burst transmitted periodically by a base station on one of several frequency channels assigned to the base station. The frequency correction burst signal 31 is an unmodulated tone transmitted at a specific offset from a carrier frequency of the channel. GPS mobile device 10 may make an open loop measurement of frequency error from the frequency correction burst to determine frequency offset 35A.

As one or more of broadcast signals 31, 32, 33, 34A and 34B are well-known, for example in General System Mobile (GSM) systems and Code Domain Multiple Access (CDMA) systems, among other known cellular systems, unnecessary details regarding such signals are not repeated here for purposes of clarity.

In an alternative embodiment, optional reference oscillator steering circuit 142 of FIG. 4 is used to provide reference oscillator steering 35B. In this embodiment, frequency correction signal 31 is used in connection with steering circuit 142 (shown in FIG. 4) to maintain reference oscillator 138 (shown in FIG. 4) within its nominal operating frequency range. Steering circuit 142 may comprise a digital-to-analog converter connected to a voltage control input of an oscillator 138 (shown in FIG. 4). Frequency steering a reference oscillator based on a frequency correction signal is well known in cellular handsets and is generally a requirement to ensure that the handset transmitter is precisely maintained at an assigned transmission frequency. However, as GPS mobile device 10 does not comprise a cellular signal transmitter, there is no requirement to maintain a transmission frequency. Furthermore, GPS devices, in contrast to AGPS devices, tend to operate off a non-steered reference oscillator, such as an oscillator without voltage control. Thus, a non-steered reference oscillator 138 (shown in FIG. 4) may be used along with frequency correction signal 31 to provide, or compute such as with cellular acquisition baseband processor 136 (shown in FIG. 4), frequency offset 35A. Frequency offset 35A is provided to frequency and delay search window 41.

Figure 5:
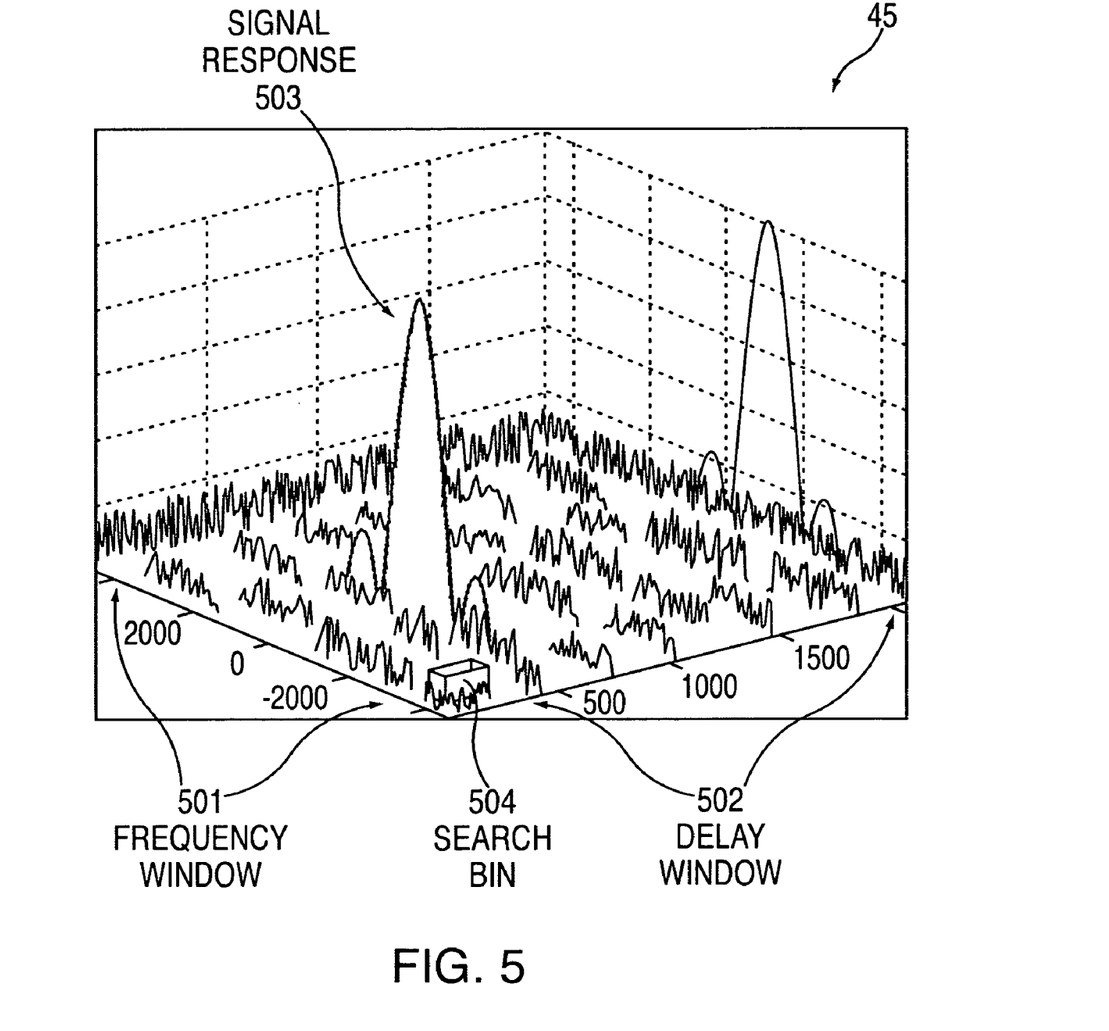
FIG. 5 is a signal detection diagram of an exemplary embodiment of a frequency and delay window in accordance with one or more aspects of the present invention.

An example of a frequency and delay search window 45 for a particular GPS satellite signal 11 is shown in FIG. 5. As will be understood to those familiar with the art, frequency and delay window 45 comprises a two dimensional space of uncertain frequency on frequency window 501 axis and uncertain code delay on delay window 502 axis. To acquire a GPS signal, a GPS receiver 10 (shown in FIG. 4) searches frequency and delay search windows 501 and 502, respectively for a GPS signal. An exemplary GPS signal response 503 is shown in FIG. 5. GPS receiver 10 (shown in FIG. 4) detects signal response 503 by scanning with one or more search bins 504. If frequency and/or delay uncertainty is large, this search can be time consuming. This is especially true in indoor environments where, in order to obtain needed signal-to-noise ratio enhancements, GPS receiver 10 (shown in FIG. 4) dwells for periods of several seconds accumulating signal power before advancing search bin 504. Thus, it is beneficial to keep frequency and delay search windows 501 and 502 as small as possible, especially for indoor operation.

With continuing reference to FIG. 5 and renewed reference to FIG. 1, frequency window 501 is a function of Doppler uncertainty (due to the relative motion of GPS device 10 with respect to GPS satellite 11) as well as frequency uncertainty due to imprecision of reference oscillator 138 (shown in FIG. 4) in GPS device 10. Frequency offset 35A (shown in FIG. 3) provides an accurate estimate of offset from a reference oscillator 138 (shown in FIG. 4) as frequency correction signal 31 is conventionally transmitted at a precise frequency. Thus, contribution of reference oscillator 138 uncertainty to the frequency window 501 may be substantially reduced or eliminated with frequency offset 35A. It should be noted that adjustment of frequency window 501 may occur using a software algorithm in program memory 145 (shown in FIG. 4), with no special purpose circuit for steering voltage or controlling frequency of reference oscillator 138. Alternatively, offsetting of frequency window 501 may be achieved by altering frequency of reference oscillator 138 with reference oscillator steering circuit 142 (shown in FIG. 4).

With renewed reference to FIG. 3, time synchronization signal 32 may be obtained by GPS mobile device 10 to determine time offset 36. The nature of time synchronization signal 32 varies depending on the cellular network. In CDMA systems, time synchronization signal 32 can comprise a synchronization channel. The synchronization channel is a common channel that is broadcast over a cell coverage area. The pilot channel and synchronization channel of a particular cellular base station use an identical PN sequence, such as a PN sequence of $2^{15}$ chips. Additionally, the synchronization channel is modulated with a particular Walsh code, allowing it to be separated from paging and traffic channels using different Walsh codes. The synchronization channel carries a timing message 33. Specifically, in CDMA, the synchronization channel carries a message containing a pilot PN offset that identifies time of day offset of such pilot channel.

With renewed reference to FIGS. 3 and 4, in a CDMA compatible embodiment, GPS device 10 may first detect a pilot channel of a nearby base station 13 with cellular acquisition front end 131, then proceed to decode a synchronization channel being broadcast by the same base station 13. GPS device 10 achieves synchronization to such a pilot channel at a particular timing offset of GPS device 10 local timekeeping counter 139. Shortly thereafter, GPS device 10 receives time message 33 containing a time of day offset of such a pilot channel. GPS device 10 uses time message 33, along with the timing offset of local timekeeping counter 139, to compute time offset 36. Since, in CDMA, base station 13 time of day is synchronized to GPS time used by GPS satellites 11 (shown in FIG. 1), time offset 36 provides an absolute offset between local timekeeping counter 139 and GPS time.

In GSM systems, time synchronization signal 32 is a synchronization burst transmitted periodically by base station 13 on one of several frequency slots assigned to cellular base station 13. Time synchronization signal 32 contains a unique header, such as a known sequence of bits, that identifies a starting point of a burst. In addition, time synchronization signal 32 carries a timing message 33 that comprises, among other elements, a GSM time stamp associated with such synchronization burst. In a GSM compatible embodiment, GPS device 10 receives time synchronization signal 32, and uses header information therefrom to identify a starting point of a synchronization burst therein relative to local timekeeping counter 139. GPS device 10 uses this information, combined with timing message 33, to compute time offset 36. In this manner time offset 36 provides an offset between local timekeeping counter 139 and GSM timing of base station 13. In some GSM networks, GSM timing is not synchronized with GPS time. Therefore, time offset 36 does not provide an absolute time offset to GPS time. Time offset 36 may however be used beneficially as an indicator of relative time, as discussed below.

Time accuracy of time offset 36 will be dependent on the cellular network implementation. In systems such as CDMA that incorporate GPS timing within the cellular network, there is a high degree of timing accuracy. In other networks, for example GSM, relative timing of a time synchronization burst may be good, but an unknown offset may exist to GPS time. Finally in some systems, a time indicator may be an absolute indicator, but with limited accuracy, for example time coming from a computer server 23 (shown in FIG. 2), in which time and date were manually set.

Depending on accuracy, available time offset 36 may be employed for several purposes within GPS device 10. If timing offset 36 has precision substantially better than one millisecond, precise time component 41 of timing offset 36 may be incorporated into frequency and delay search window 45. Specifically, with additional reference to FIG. 5, it is well known that, in the general case when precise timing is not available, delay window 502 spans an entire period of C/A code, nominally one millisecond (C/A code conventionally refers to codes available for civilian applications). This is because timing of locally generated C/A code within GPS baseband processor 137 is arbitrary relative to GPS signals 12 (shown in FIG. 1). However, if precise time component 41 is available, locally generated C/A code can be timed relative to GPS signals 12 (shown in FIG. 1). Specifically, GPS device 10 uses timekeeping counter 139 that is common to a C/A code generator within GPS baseband 137 and to cellular acquisition baseband 136. Thus, time offset 36, determined from a time synchronization signal 32 as described above, can be used in conjunction with local timekeeping counter 139 to program a starting point of locally generated code relative to GPS timing. In this manner, an uncertainty component of delay window 502 caused by an unknown relative timing of locally generated code is substantially reduced or eliminated. A remaining delay window 502 component is delay uncertainty related to unknown pseudorange and any error in precise time component 41. As discussed below, a pseudorange may be estimated from satellite trajectory models and an estimate of position, such as a position information 34b. Thus, if precise time component 41 is accurate to substantially less than one millisecond, delay window 502 may be reduced to substantially less than one millisecond.

With continuing reference to FIGS. 3, 4 and 5, reducing frequency window 501 as an aspect and delay window 502 as another aspect, substantially reduces the total number of search bins needed to overall cover two dimensional frequency and delay search window 45. As mentioned, this enables GPS receiver 10, or more particularly GPS baseband processor 137, to search more rapidly, and therefore reduce the time needed to obtain GPS satellite signals 12 (shown in FIG. 1). Furthermore, a reduced search window provides GPS mobile device 10 an opportunity to dwell longer at each search bin. Longer dwells provide signal-to-noise ratio enhancements that can enable weak signal reception indoors.

Optionally, time offset 36 is provided to coherent averaging 50. Coherent averaging 50 improves signal-to-noise ratio in each search bin by averaging correlation results from several consecutive cycles of C/A code. When coherent averaging, impact of 50 bps navigation data bits on a GPS signal is to be considered. Specifically, due to navigation data bits, a GPS signal undergoes a potential 180 degree phase transition every 20 cycles of C/A code. For signal-to-noise ratio enhancement, coherent averaging is performed over twenty consecutive cycles of C/A code comprising a single navigation data bit. Furthermore, to enhance performance this averaging process should be synchronous with navigation data bit timing, otherwise changing data bits may partially defeat such an averaging process. For this reason, it is desirable to achieve synchronization of coherent averaging 50 with navigation data bit timing. Navigation data bit timing is uniform for all satellites 11 (shown in FIG. 1) and synchronized with GPS time.

Timing of a data bit arriving at GPS device 10 is a function of local timekeeping counter 139 as well as pseudorange delay between GPS device 10 and a satellite 11 (shown in FIG. 1). Precise time component 41 establishes a relationship between local timekeeping counter 139 and GPS time. Thus, if pseudorange is estimated as described below, precise time component 41 may be used in conjunction with local timekeeping counter 139 to control start and stop times of coherent averaging 50 so as to make a coherent averaging interval coincident with incoming navigation data bits.

Time of day 42 is the absolute component of time offset 36, converted to units of GPS time units. This conversion can take several forms, for example, a conversion from a Julian data system, or some other timekeeping standard employed by the cellular network. Time of day 42 may be utilized within GPS receiver 10 even in an application where precision of time offset 36 is not better than one millisecond, namely, when precise time component 41 cannot be generated. In particular, time of day 42 provides a reference time for ascertaining satellite positions 43. Specifically, time of day 42 provides a reference time for satellite trajectory model 39. As satellites 11 move rapidly through the sky, it is preferable that time of day 42 be accurate, within approximately at least ten milliseconds, so that errors in prediction of satellite positions will be on the order of meters or less. If, however, time of day 42 does not provide this level of accuracy, error in time of day 42 may be solved for as part of a navigation solution. In the latter situation, accuracy of time of day 42 is unimportant, and a rough estimate of time is sufficient, such as the time provided by a server or a real time clock. An example of such a method is Time Free GPS, as described in more detail in co-pending application entitled "METHOD AND APPARATUS FOR TIME-FREE PROCESSING OF GPS SIGNALS" to Frank van Diggelen, application Ser. No. 09/715,860, filed Nov. 17, 2000, now U.S. Pat. No. 6,417,801.

If time offset 36 has an arbitrary relationship to GPS time, time of day 42 will not be directly available. However, time offset 36 may be beneficial as an indicator of relative time. For example, GPS mobile device 10 may determine an initial time of day by the conventional method of decoding the time of week (TOW) portion of a navigation data stream. TOW can be used to determine a relationship between cellular network time and GPS time. For example, time offset 36 may represent offset between GSM system time and GPS time of day. Once this relationship is established, it may remain constant for extended time periods as cellular base stations use precise oscillators to generate their timing signals. Thus, GPS mobile device 10 may use time offset 36 to determine time of day 42 based on a previously determined relationship between a cellular network and GPS time. In this manner, GPS mobile device 10 may be able to obtain positions in indoor operating environments, utilizing a time synchronization burst from time synchronization signal 32 to ascertain time of day. Furthermore, GPS mobile device 10 can function without a battery powered real-time clock to maintain time.

Cellular base station 13 may provide a cell identification number 34A. The details of this message vary with cellular network. Cell identification number 34A may be used to look up location of cellular base station 13 in a lookup table 37 stored in memory of GPS mobile device 10. This will give an approximate or estimated position 38 of GPS mobile device 10, namely, GPS mobile device 10 will be within the sector associated with longitude and latitude of communication tower 13 location. As sector sizes vary from rural, suburban and metropolitan area networks, this position estimate 38 will vary accordingly depending on location of cellular base station 13 within one of the above-mentioned area networks. In those instances where cellular base station 13 is configured to provide its cell location 35B, cell location lookup table 37 may be avoided and an estimate of position 38 provided based on cell location signal 34B.

Estimate of position 38 is provided for line of sight calculation 40. Specifically, estimate of position 38 is combined with satellite positions, velocities and clock estimates 43 to determine expected pseudoranges and pseudorange rates 44, and unit vectors 49 between GPS device 10 and each GPS satellite 11 (shown in FIG. 1). Line of sight calculation 40, pseudorange and pseudorange rates 44, unit vectors 49, and delay and frequency measurements 47, are sufficient for position, velocity, and time computation 48. The details of such computations are well known and will not be repeated here for purposes of clarity.

Pseudo range and pseudorange rates 44 are provided to frequency and delay search window 45. In particular, pseudorange rate provides an estimate of Doppler shift between GPS mobile device 10 and each GPS satellite (shown in FIG. 1), allowing frequency window 501 to be determined. Similarly, pseudorange provides an estimate of timing delay between GPS mobile device 10 and each GPS satellite 11 (shown in FIG. 1), facilitating determination of delay window 502. As mentioned above, pseudorange and pseudorange rate 44 are components of frequency and delay search window 45, more particularly frequency uncertainty in reference oscillator 138 and time uncertainty of locally generated C/A code tied to time keeping counter 139, both of which may be substantially reduced by means of cellular acquisition signals 102.

Integrated circuit 135 may comprise a time keeping counter 139 for providing dock signals to baseband processors 136 and 137. A reference oscillator 138 may be used to provide a determined frequency within a tolerance to timekeeping counter 139. A general purpose processor, such as a microprocessor, 141 is coupled to receive information from acquisition signal baseband 136 to provide an output to GPS baseband 137, as described with reference to FIG. 3. Microprocessor 141 is coupled to memory 146, which may comprise partitioned memory or individual memories 144 and 145. For individual memories, program memory 145 is used to store programming, as described with reference to FIG. 3, for using one or more cellular acquisition signals to provide information regarding satellite range and range rate. Accordingly, program memory may be a programmable, non-volatile memory, such as an EPROM, E²PROM, flash memory, and the like. Data memory 144 may be used to temporarily store data for microprocessor 141. Accordingly, data memory 144 may be a programmable volatile memory, such as DRAM, SRAM, and the like. Optionally, a docking station, data modem and/or network interface 143 may be coupled to microprocessor 141 for receiving one or more satellite trajectory models. Optionally, a digital-to-analog (D/A) converter 142 may be coupled to microprocessor 141 to receive a digital signal of a frequency and convert it to an analog signal of the same frequency for providing a steering voltage to reference oscillator 138.

It should be appreciated that the incremental circuitry in the GPS device to receive and utilize cellular acquisition signals is minimal. In particular, the scope and cost of this circuitry is far less than that of a complete cell phone, which would include transmission circuitry, digital signal processing circuitry, voice processing circuitry, a protocol stack processor, and many other components. Thus, it is anticipated that a GPS system in accordance with one or more aspects of the present invention may be manufactured with less cost than that to produce conventional AGPS system.

While the embodiments described herein have provided details for GSM and CDMA systems, it should be apparent that the invention can be employed in all types of cellular networks including iDEN, TDMA, AMPS, GPRS, CDMA-2000 and other 2.5 networks, and W-CDMA and other 3G networks. Furthermore, the invention can accept multiple types of cellular acquisition signals in a single device. In particular cellular acquisition front end 131 and cellular acquisition baseband 136 may be configured to incorporate simultaneous or sequential processing of signals from multiple networks. This would further facilitate use of a GPS device 10 anywhere in the world, not just within a prescribed coverage region, and accordingly it would be desirable to provide an ability to receive and use a set of cellular network signals.

Though GPS satellites were described, it should be appreciated that one or more aspects of the present invention may be used with pseudolites, ground based transmitters that broadcast a PN code similar to a GPS signal. Accordingly, the term "satellites", as used herein, is intended to include pseudolites and equivalents thereof. Moreover, the term "satellite signals" or "GPS signals" is intended to include satellite-like and GPS-like signals from pseudolites and equivalents thereof. Furthermore, though a GPS system was described, it should be appreciated that one or more aspects of the present invention are equally applicable to similar satellite positioning systems, including without limitation the Russian Glonass system.

While the foregoing is directed to the preferred embodiment of the present invention, other and further embodiments of the invention may be devised without departing from the basic scope thereof, and the scope thereof is determined by the claims that follow.

What is claimed is:

1. A method for determining position of a Global Positioning System (GPS) handheld device, the method comprising:
    obtaining, from a base station in a cellular network, Global Position System Assistance (GPS-A) data without a fee-based subscription to the base station, wherein obtaining GPS-A data without a fee-based subscription further comprises:
        detecting a pilot signal of a base station;
        decoding a synchronization channel being broadcast by the same base station at a particular offset to a local timekeeping counter;
    determining, responsive to the GPS-A data, a position estimate of the GPS handheld device;
    acquiring a GPS satellite signal using the GPS-A data.

2. The method of claim 1, further comprising:
    computing, responsive to the position estimate, any of a pseudorange and a pseudorange rate.

3. The method of claim 2, further comprising:
determining, based on the GPS-A, a window of delay search for receiving GPS signals, wherein the window of delay search is smaller than a range of possible delays.

4. The method of claim 2, further comprising:
synchronizing, responsive to computing the pseudorange, calculating a coherent averaging of navigation data bits.

5. The method of claim 1, further comprising:
computing, responsive to the position estimate, a pseudorange rate; and
wherein computing responsive to the position estimate further comprises determining a window of frequency search for acquisitioning the GPS satellite signal.

6. The method of claim 1, wherein the GPS-A comprises a location of the base station.

7. The method of claim 1, wherein the GPS-A is a cell identifier of the base station.

8. The method of claim 7, wherein determining the position estimate comprises:
using the cell identifier to obtain a location of the base station from a lookup table having a relationship between the location and the cell identifier.

9. The method of claim 1, wherein the GPSA further comprises a frequency correction burst.

10. The method of claim 9, wherein acquiring the GPS satellite signal further comprises:
determining a frequency offset, based on the frequency correction burst; and
determining a window of frequency search based on the frequency offset, said window of frequency search being smaller than a range of possible frequencies.

11. The method of claim 1, wherein the GPSA further comprises a time synchronization signal.

12. The method of claim 11, further comprising:
determining a timing offset based on the time synchronization signal; and
determining time of day based on the timing offset.

13. The method of claim 1, further comprising:
using said particular offset at which the synchronization channel from the same base station was encoded to compute another time offset; and
using said another time offset computed from the particular offset at which the synchronization channel from the same base station was encoded as an absolute time offset between the local timekeeping counter and GPS time.

14. The method of claim 1, further comprising:
using said particular offset to compute another time offset;
using said another time offset as an absolute time offset between the local timekeeping counter and GPS time if the base station is in a cellular network that is synchronized to GPS time;
using said another time offset and the local timekeeping counter to reduce a delay search window if the base station is in a cellular network that is not synchronized to GPS time.

* * * * *